United States Patent [19]

Valyi

[11] Patent Number: 5,529,195
[45] Date of Patent: Jun. 25, 1996

[54] BLOW MOLDED PLASTIC CONTAINER AND METHOD

[75] Inventor: Emery I. Valyi, Katonah, N.Y.

[73] Assignee: PepsiCo., Inc., Purchase, N.Y.

[21] Appl. No.: 242,427

[22] Filed: May 13, 1994

[51] Int. Cl.⁶ ..................................................... B65D 1/04
[52] U.S. Cl. .................. 215/6; 215/372; 220/501
[58] Field of Search ................. 215/6, 1 C, 371, 215/372, 373, 382, 384; 220/501, 505

[56] References Cited

U.S. PATENT DOCUMENTS

| | | | |
|---|---|---|---|
| 544,219 | 8/1895 | Godet | 215/6 X |
| 2,335,016 | 11/1943 | Lorenzen et al. | 215/6 X |
| 2,661,870 | 12/1953 | Huenergardt | 215/6 X |
| 3,076,573 | 2/1963 | Thomas | 215/6 |
| 3,232,495 | 1/1966 | Schneider | 215/100 A X |
| 3,467,269 | 9/1969 | Newton | 215/6 |
| 4,550,848 | 11/1985 | Sucato | 215/6 X |
| 5,232,108 | 8/1993 | Nakamura | 215/10 X |
| 5,261,545 | 11/1993 | Ota et al. | 215/371 X |
| 5,269,441 | 12/1993 | O'Meara | 215/6 X |

Primary Examiner—Allan N. Shoap
Assistant Examiner—Christopher J. McDonald
Attorney, Agent, or Firm—Bachman & LaPointe

[57] ABSTRACT

A plastic preform for forming blow molded containers including at least one internal wall member separately formed from the molded plastic article and extending completely across the hollow space therein, wherein the internal wall member has edge portions which engage the body portion and are joined thereto. Also discloses the blow molded plastic container and method for forming preform and container.

25 Claims, 5 Drawing Sheets

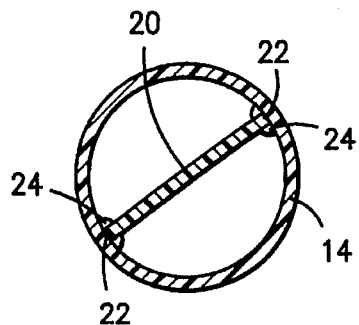
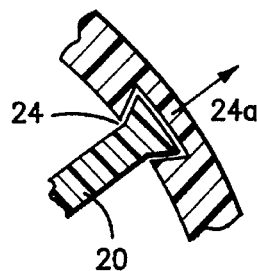
FIG-2    FIG-2A
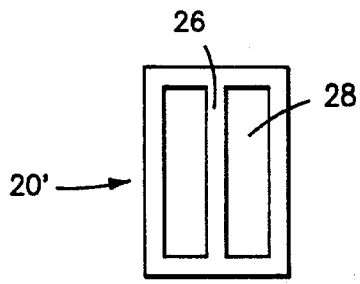
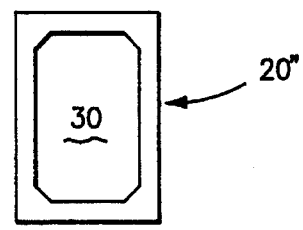
FIG-3    FIG-4
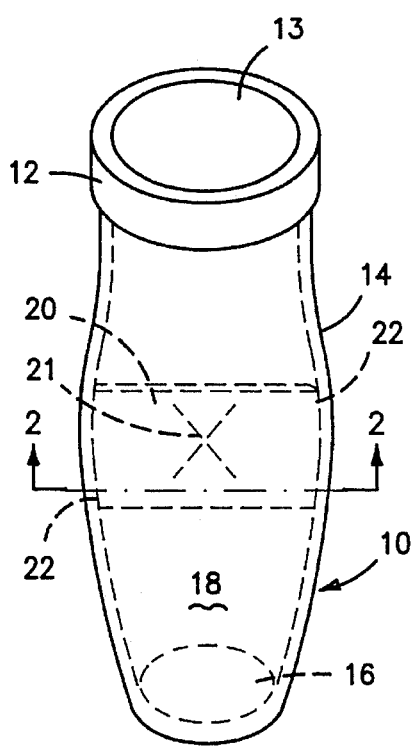
FIG-1
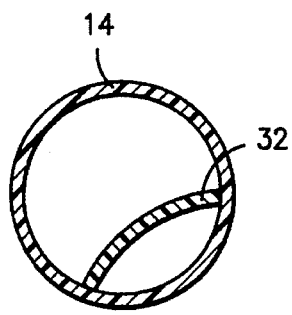
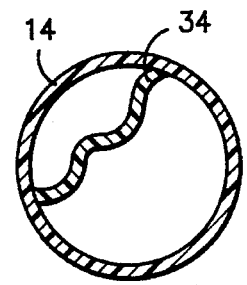
FIG-5    FIG-6

BLOW MOLDED PLASTIC CONTAINER AND METHOD

BACKGROUND OF THE INVENTION

The present invention relates to plastic preforms for preparing plastic containers especially for retention of fluids, as for carbonated beverages or the like. These containers may be prepared from a preform which may be injection or extrusion molded, followed by blow molding the preform into a suitably shaped container using a blow mold having the desired shape. Typical thermoplastic materials are polyethylene terephthalate (PET), polyolefins, etc., although others can be used.

The container and preform from which it is prepared generally includes a neck portion with a cap retaining means, a shoulder portion depending therefrom, a side wall or main body portion depending from the shoulder portion and a bottom portion joined to the side wall and depending therefrom. In many of these containers the bottom portion desirably has a champagne bottle bottom configuration with an axially, inwardly directed generally conical part.

In addition, the public prefers large size containers especially for the convenience and economy they represent, as, for example, the two liter containers widely used for carbonated beverages. Indeed, even larger containers would be desirable. However, these containers are awkward to handle, especially for small children. In addition, the walls of these containers tend to bulge, making them even more awkward to handle.

These bottles are made of different plastics, e.g., milk bottles are polyethylene (PE), still-water bottles often polyvinylchloride (PVC), and bottles for carbonated beverages are PET.

U.S. Pat. No. 5,242,066 describes a blow molded plastic bottle having neck, a side wall and a base, and including an internal member termed a spider attached to the side wall of the bottle which is said to increase the strength of the bottle. The bottle is formed from an injection molded preform, an integral portion of which the said spider is a part. A blown bottle is then made containing several compartments separated by the spider, which may also reinforce the side wall.

In order to facilitate handling large containers, handles or handgrips, are made in various ways, depending primarily on the material of the bottle and the process best suited to convert it into the desired shape. Thus, PE bottles are made by extrusion blow molding, a process in which a hollow handle may be made by action of the same mold that shapes the extruded preform into the bottle itself, as is well known. The prerequisites for this technique are an extruded preform and a plastic, such as PE, that may be readily pressure welded. Bottles made of PET from injection molded preforms do not have hollow, integral handles, because it is well-nigh impossible to weld PET into a closed handle by the above technique.

The art shows ways to provide handles for PET bottles, but none of them are integral with the body of the bottle, i.e., made from the preform used to blow the bottle itself. Instead, separately made handles are mechanically attached, or molded onto the finished body in a separate molding step, e.g., as shown in U.S. Pat. No. 4,727,997 to Y. Nakamura. This is an expensive and often unreliable procedure that is commercially unsuccessful.

A handgrip may be used as a substitute for a handle, the difference between the two being that, in grasping a handle, at least one finger of the user's hand is inserted into a hole formed by a loop attached to the bottle, or integral therewith while the handgrip, or simply grip, is formed by indentations in the bottle wall designed to permit grasping the grip between the thumb and forefingers.

Such a grip may be readily produced as an integral part of the bottle from an otherwise normal preform in a mold that has a corresponding cavity as part of the one forming the rest of the bottle wall. PET bottles with such a grip are used commercially, as for example to package spirits, wine and other liquids in large sizes, usually over 2 liters.

The same design cannot be used for bottles subjected to internal pressure, as in the case of carbonated beverages. It is well known that in a thin-walled, elastic, cylindrical body subject to internal pressure any indentation will bulge out and the body will assume a substantially circular cross-section in place of indentations that may have been present before pressure was applied.

One purpose of this invention is to provide an improved preform and an economical and aesthetically pleasing bottle made therefrom, which bottle may have a grip as part of its side-wall and which has an internal, integral reinforcing member to divide the container, to reinforce its walls, and to preclude everting under internal pressure, as the case may be.

Accordingly, it is a principal object of the present invention to provide an improved plastic preform, an improved blow molded plastic container and an improved method for preparing same.

It is a further object of the present invention to provide improvements as aforesaid which are inexpensive to obtain and are expeditious to provide on a commercial scale.

Further objects and advantages of the present invention will appear hereinbelow.

SUMMARY OF THE INVENTION

In accordance with the present invention, the foregoing objects and advantages may be readily obtained.

The present invention includes a plastic preform for forming blow molded plastic containers. The preform comprises: a molded plastic article having a neck portion defining an opening, a body portion depending therefrom, and an integral, closed bottom portion depending from the body portion; wherein the body portion defines a hollow space closed at the bottom portion and open at the neck portion; and at least one internal wall member separately formed from said entire article and inserted thereinto and extending completely across said hollow space, wherein said internal wall member has edge portions thereof which engage the body portion and are joined thereto as by welding, adhesive bonding, or by mechanical means.

The internal wall member may be joined to both the body and bottom portions to provide support and reinforcement for those portions of the container that are blow molded from these, or may be limited in extent so that it is welded only to the portion corresponding to locations in the container that require support and reinforcement. The preform is preferably tube-like, with an externally threaded neck portion.

In a preferred embodiment, the internal wall member includes a solid portion extending completely across the hollow space and welded to the body portion, and a frame portion adjoining the solid portion extending to the bottom portion of the preform and welded to both the body and bottom portions, including a hollow internal space between the solid portion of the internal wall and the bottom portion of the preform.

The present invention also resides in the method of molding said preform and the blow molded container prepared from the aforesaid preform. The container generally includes a shoulder portion between the neck and body portions, wherein solid portion of the internal member may terminate in the body portion spaced from the shoulder portion and/or the bottom portion.

In a preferred embodiment, the body portion defines regions that comprise at least two adjoining lobes, with said lobes having two spaced depressions and a wall portion extending from one spaced depression to the other to form a handgrip, and with said internal member extending from one spaced depression to the other.

The present invention forms a plastic preform suitable for forming blow molded plastic containers by forming an internal wall member independently and apart from said article, said member having edge portions thereof, and joining the said edge portions, as by welding, adhesive bonding or mechanical means to a molded plastic article having a neck portion defining an opening, a body portion depending therefrom, and an integral, closed bottom portion depending from the body portion, wherein the body portion defines a hollow space closed at the bottom and open at the neck portion, provided that the internal wall member is joined so that said member extends completely across said hollow space and is joined at least to said body portion. Since the preform is made from two separate pieces, the bottle retains a distinct boundary between the partition and bottle sidewall where the edge portions of the partition attach to the sidewall. This is in contrast to partitioned bottles that are formed from one piece preforms.

In a preferred embodiment, the internal wall member is placed in a slot in an injection core and the plastic article is injection molded therearound to form a plastic preform with an internal wall member welded therein. In a particularly preferred embodiment, the internal wall member is a frame-like member including a solid portion and a frame portion adjacent the solid portion defining an open space, wherein the frame-like member is placed in a slot in an injection core and the plastic article is injection molded therearound as aforesaid, whereby the internal wall member includes a solid portion extending completely across the hollow space and joined to the body portion, and a frame portion below the solid portion extending to the bottom portion and including an open internal space between the solid portion of the internal wall and the bottom portion of the preform, said frame-like member precluding penetration of molten plastic into said slot during injection. The internal wall member may be welded to both the bottom and body portions and preferably terminates in the body portion. Alternatively, the internal wall member may be limited in extent to the body portion only.

In a further variation, the separately formed internal wall member may be placed in a previously molded plastic preform and the edge portions of the internal wall member joined to the body portion of the preform in the desired location thereof.

The process of the present invention advantageously forms a blow molded plastic container having an internal wall member therein by blow molding the thus formed preform into a desired configuration. In a particularly preferred embodiment, the process includes the step of blow molding the preform into a configuration having a container body portion corresponding to said preform body portion, with at least two lobes in the container body portion separated by depressions, wherein the depressions are separated by the internal wall member and supported thereby, and wherein the lobes serve as a handgrip.

It is a particular advantage of the present invention that the internal wall member may be of the same or different material as the remainder of the container in order to tailor desired final properties.

Further features of and advantages of the present invention will appear hereinbelow.

BRIEF DESCRIPTION OF THE DRAWINGS

The present invention will be more readily understandable from a consideration of the following illustrative drawings, wherein:

FIG. 1 is a perspective view of a preform of the present invention;

FIG. 2 is a sectional view taken along lines 2—2 of FIG. 1;

FIG. 2A is an enlarged view of a portion of FIG. 2 showing an alternate embodiment;

FIGS. 3–4 are alternate embodiments of the internal member;

FIGS. 5–6 are alternate embodiments similar to FIG. 2;

DETAILED DESCRIPTION OF THE PREFERRED EMBODIMENTS

Figure 11:
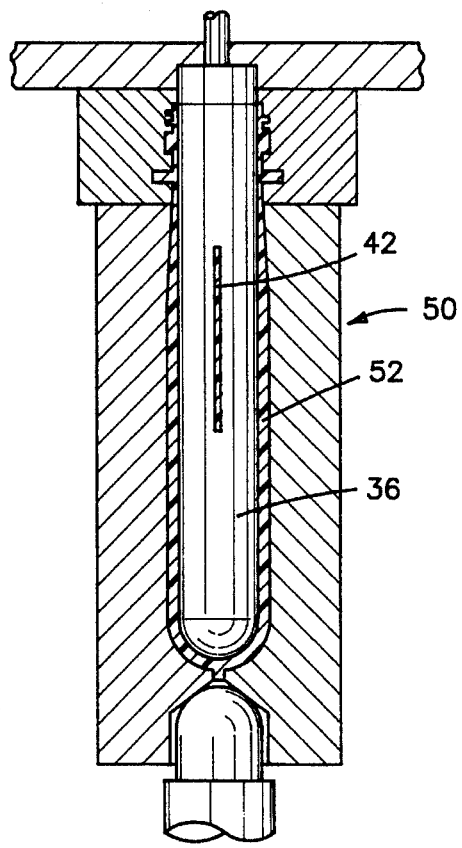
FIG. 11 is a sectional view of a core-injection mold assembly for forming a preform of the present invention using the core of FIG. 7 and the internal member of FIG. 8.

FIG. 1 shows a plastic preform 10 suitable for use in forming blow molded containers. Preform 10 may be prepared by any suitable method, as by injection molding or extrusion molding. Preform 10 may be previously prepared and stored for subsequent processing or may be prepared in-line with subsequent operations. The preform has a neck portion 12, which may or may not be threaded, with the neck portion defining an opening 13, a body portion 14 depending from the neck portion and an integral, closed bottom portion 16 depending from the body portion. The preform body portion defines a hollow space 18 closed at the bottom and open at the neck portion. As shown in FIG. 1, preform 10 has a tube-like configuration, but it may of course take any desired or convenient shape.

An internal member 20, shown in phantom in FIG. 1, is separately formed from the preform and which may be of the same or different material as the preform, is inserted in hollow space 18 via opening 13, as by a robot (not shown). The preform has edge regions 22 which are placed adjacent body portion 14 and which are welded to the body portion at sites 24 (see FIG. 2) to form a preform containing a welded internal member. Internal member 20 may include a decoration 21 thereon which may be visible through the wall of the final container.

The wall member 20 may be fabricated by any desired or convenient method, as by injection molding or extrusion, stamping or any other conventional forming technique. In the embodiment of FIG. 1, the wall member 20 has a solid configuration, but one may use other configurations, as that shown in FIG. 3 wherein internal wall member 20' includes one or more struts 26 and spaces 28, or that shown in FIG. 4 where internal wall member 20" is a frame-like member with an open central area 30. Both of these embodiments reduce the weight of the wall member while still providing internal support for the final blow molded container against eversion or other deformation under pressure.

The present invention thus provides a simple, convenient and economical method for preparing a preform with an internal supporting wall. The internal supporting wall may be limited in extent to the body portion of the container as shown in FIG. 1, or may have any desired length, as extending all the way to the bottom portion to provide support for the bottom portion, or extending all the way up to the neck portion to provide a multi-compartment preform. Thus, the present invention offers a versatile and convenient procedure for preparing a variety of embodiments.

The placement of the wall member is effected by suitable mechanical means, such as a robot preferably but not necessarily attached to the machine that produces the preform. For example, with an injection machine equipped with a take-out robot, the latter may serve to place the preform and wall member into a fixture for assembly. Once so placed, the wall member is joined to the inside wall of the preform by any convenient means, e.g., high-frequency, ultrasonic, or pressure welding or by means of an adhesive bond.

Alternatively, wall member 20 may be fixed within the preform by mechanical means, as shown in the enlargement of FIG. 2A wherein site 24 (enlarged) is an interlocking tongue-and-groove assembly designed to resist tension in the direction of arrow 24a while the preform is blow-molded into the bottle shape, and thereafter, as the bottle is pressurized.

The embodiments of FIGS. 5 and 6 show a curved wall member 32 or a wavy wall member 34, both of which simply straighten out as the preform expands during blow molding, instead of being drawn and reduced in thickness. Each of members 32 or 34 has that length and cross-section which will straighten into the distance between the corresponding side walls of the blown bottle.

Wall member 20 may be made of the same material, e.g., PET, as that of preform 10, or of a different material, such as another plastic or metal, e.g., aluminum. In addition, member 20 may be transparent, translucent, or colored to contrast with preform 10, and it may be provided with a decoration, as indicated by the marking "X" in FIG. 1.

Thus, in accordance with the embodiments of FIGS. 1–6 one can simply and conveniently form a preform with an internal wall member retained therein. The wall member may be exactly designed to suit needs, as it may extend to any given level below the neck, it may or may not extend to the base as desired, and can have any desired thickness distribution, shape or configuration unlimited by constraints of an injection mold.

In accordance with the embodiment of FIGS. 7–13 a separately formed internal wall member is placed in a blow core and the preform injection molded therearound to form a preform with an internal wall member joined thereto.

Figure 7:
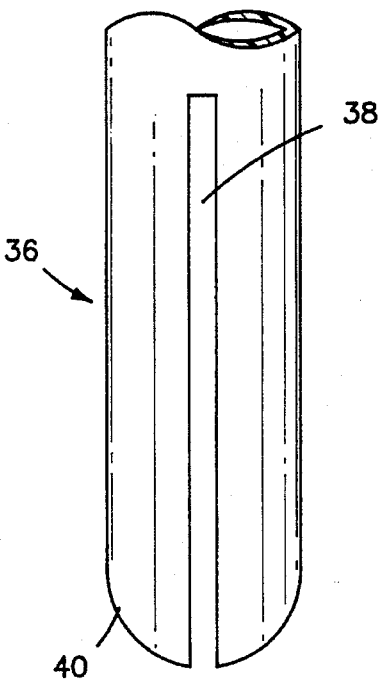
FIG. 7 is a side view of a core for forming a preform of the present invention.
Figure 8:
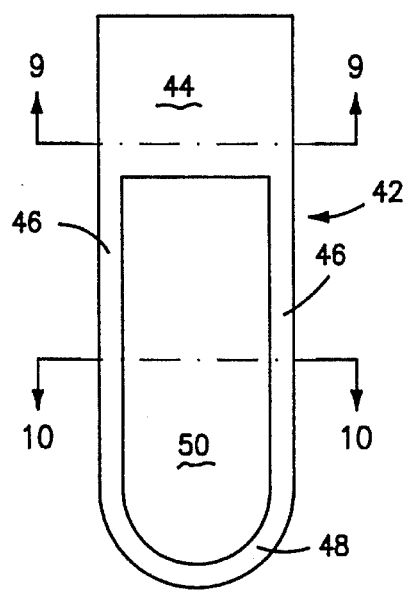
FIG. 8 is a side view of an internal member for use with the core of FIG. 7.
Figure 9:
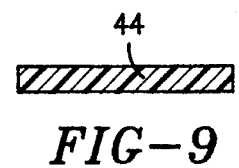
FIGS. 9–10 are sectional views taken along lines 9—9 and 10—10, respectively, of FIG. 8.
Figure 10:

FIG. 7 shows the lower end of a blow core 36 which includes a slot 38 extending from the base 40 of the core part way up into the core. A plastic insert 42, which is the internal wall member, is prepared by any suitable method, as by injection molding, stamping, or the like. At the region that is to extend completely across the hollow space of the preform, the insert includes a solid portion 44 as shown in FIG. 9. Adjacent the solid portion 44, insert 42 has a frame-like configuration with two parallel bars 46 joined by curved portion 48 defining space 50, as shown in FIG. 10. The insert 42 is placed in slot 38 of core 36 and follows the contour of the core. Thus, insert 42 has a solid portion where it is to be formed into an internal wall member extending completely across the hollow space of the preform, and it is a frame with an empty middle below the bottom terminus of the solid wall portion 44.

Figure 13:
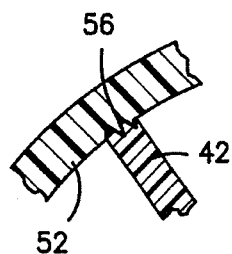
FIG. 13 is a partial sectional view similar to FIG. 2A showing an alternate embodiment.
Figure 12:
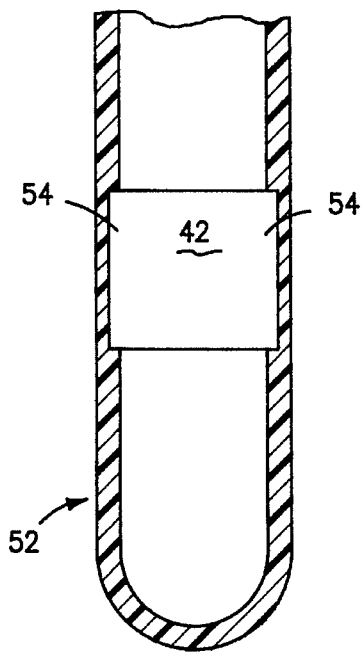
FIG. 12 is a partial sectional view of a preform of the present invention formed in the core-injection mold of FIG. 11.

In accordance with FIG. 11, core 36 having insert 42 therein is placed in injection mold 50, molten plastic injected therearound to form preform 52 welded to insert 42 by the molten plastic entering the mold during injection, while bars 46 and portion 48 keep the molten plastic from entering into space 50. The resultant preform 52 is shown in FIG. 12. Edges 54 of insert 42 at least in the area of solid portion 44 may be wider than slot 38, so that said edges become surrounded by the molten plastic entering the injection mold around core 36. Edges 54 may be provided with serations 56 as shown in FIG. 13 in order to increase contact between the edge and the incoming hot plastic and to facilitate fusion between the edge and incoming plastic.

Thus, in operation, insert 42 is placed by a robot tightly into slot 38, the injection mold closed, and the plastic injected. Edges 54 are surrounded by molten, or at the very least very hot plastic, to the effect that the edges and the plastic fuse. The frame portion of the insert serves the purpose of preventing the molten plastic from flowing into the slot, which remains empty below the solid portion of the insert. It is often necessary to keep bottom 48 of insert 42 from melting, as it faces the injection gate and thus the hottest entering plastic. To that end, bottom 48 is increased in thickness to keep the entering plastic from melting it entirely and thus breaking into slot 38.

Figure 14:
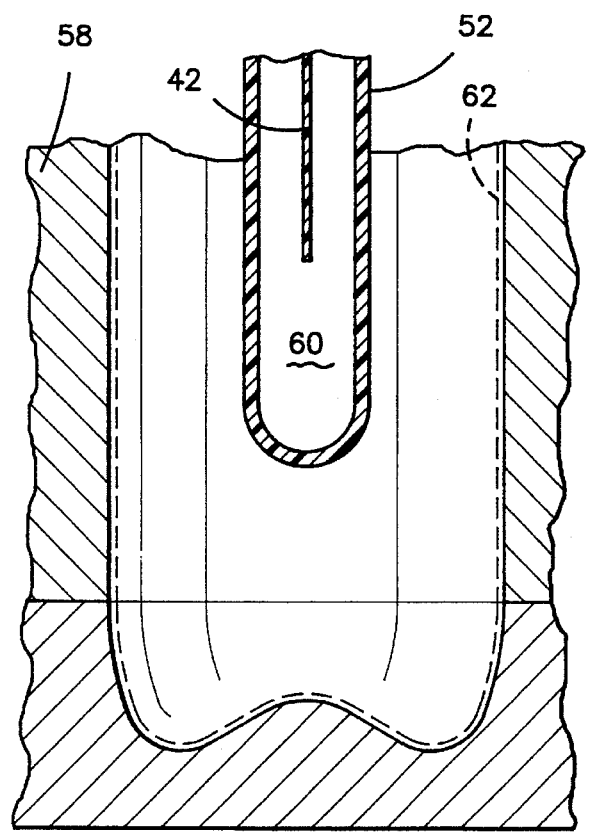
FIG. 14 is a partial sectional view through a blow mold for forming a container of the present invention from a preform similar to the preform of FIG. 12.

The warm preform 52 is then placed in a blow mold 58 as shown in FIG. 14 and a container of the present invention formed therefrom by blow molding.

The thus formed preform is brought to a temperature at which blow molding can be accomplished which may be done by heating a previously formed preform or forming the hot preform in line with the injection molding operation and suitably adjusting the temperature thereof, if necessary. Heating the internal walls, if necessary, may be done by circulating warm air inside the hollow space 60 or by inserting heaters therein.

Figure 15:
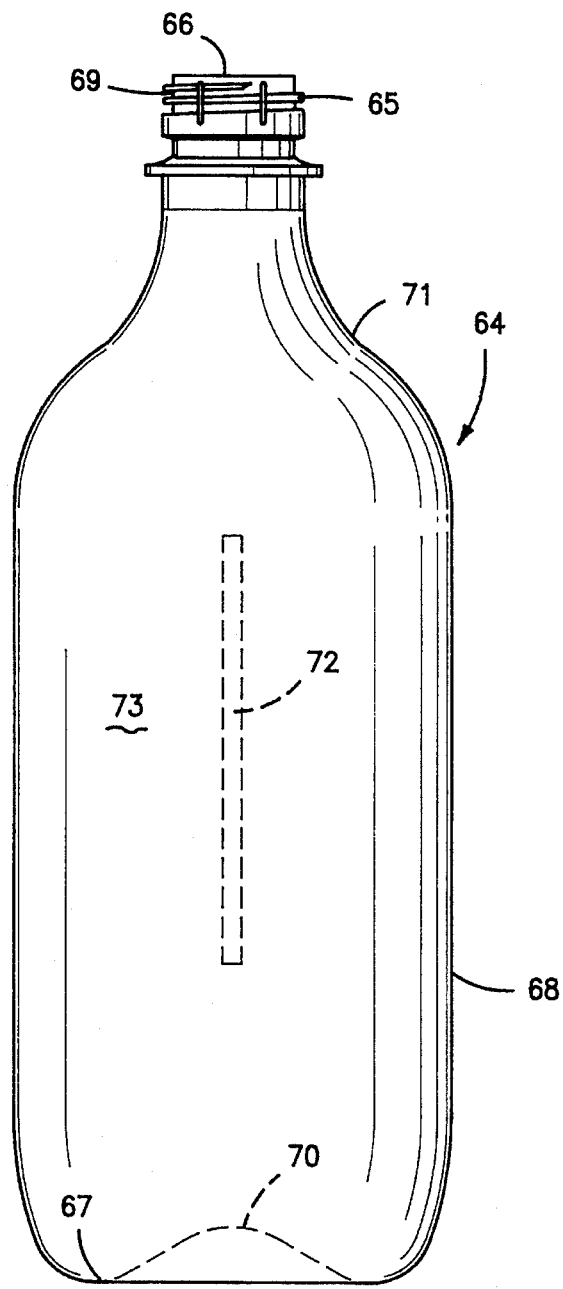
FIG. 15 is an elevational view of a blow molded container formed in FIG. 14.

The warm preform is placed in a blow mold having the configuration of the desired container, as blow mold 58 in FIG. 14, while blowing compressed air thereinto so that the preform expands into shape 62 shown in dashed lines in FIG. 14, to effect biaxial orientation and axial elongation. This procedure may be carried out with or without one or more stretch rods to effect axial elongation. The insert or internal wall member 42 will also expand to the extent permitted by the blow mold. The particular blow mold shown in FIG. 14 has an internal configuration which allows the formation of a plastic container 64 shown in FIG. 15, although naturally other configurations may be selected. Naturally, if the desired final configuration includes at least two adjoining lobes connected together by depressions, the blow mold will have this configuration. Similarly, if an axially, inwardly directed bottom part is desired as shown in FIG. 15, the blow mold will have this configuration. The preform will expand into the shape permitted by the blow mold, and the internal walls will also expand correspondingly.

Thus, blow molded, plastic container 64 is formed having a neck portion 65 defining an opening 66, a bottom portion 67, a body portion 68 as a generally tubular body portion interconnecting the neck portion 65 and the bottom portion 67. Neck portion 65 is provided with external threads 69 corresponding to the threads on the preform if a threaded preform is used to serve as the site for attachment of a closure on the container. Bottom portion 67 may have an axially, inwardly directed generally conical base 70. Alternatively, the bottom portion may exhibit protrusions (not shown) upon which the bottle may rest, termed feet, as well known in the art. In such a bottom configuration, it is preferred to position the internal wall so as to intersect opposing feet symmetrically. Container 64 also includes shoulder portion 71 connecting neck portion 65 and tubular body portion 68.

Figure 18:
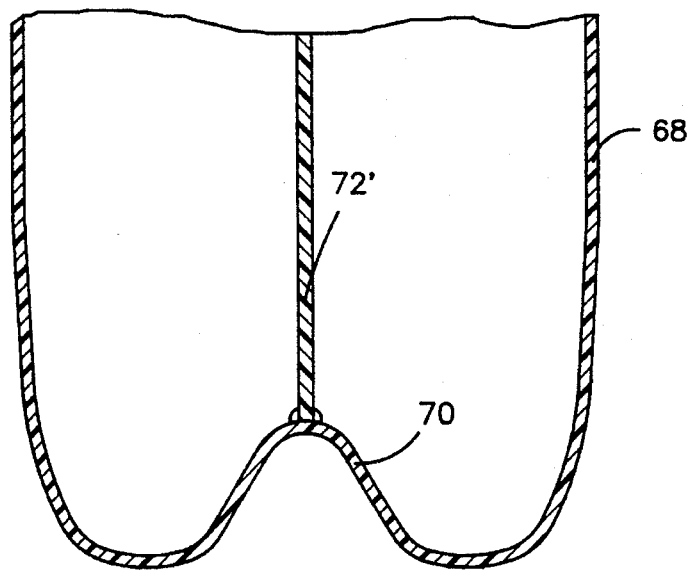
FIG. 18 is a cross-sectional view of a bottom portion of a container of the present invention including an axially, inwardly directed bottom portion with an internal member as a support therefor.

Container 64 is provided with at least one internal wall 72 which corresponds to the internal wall 42 of preform 52 and which extends completely across hollow space 73 within container 64. As can be seen in FIG. 15, internal wall is limited in extent to body portion 68, but if desired, can also extend down to axially inwardly directed part 70 as shown in FIG. 18 by internal wall 72' to also support this portion of the container.

Internal wall 72 is securely attached and preferably bonded to the container, as in FIG. 15 to the body portion 68, thus providing a firm support for the container walls.

Figure 16:
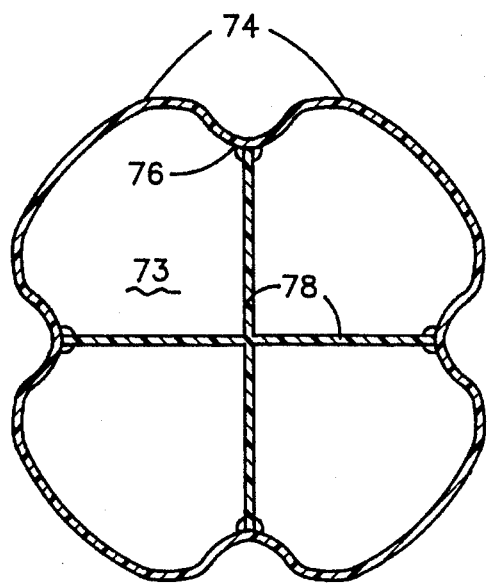
FIGS. 16–17 are cross-sectional views of alternate embodiments of containers of the present invention.

As shown in FIG. 16, container body portion 68 may define adjoining arcuate lobes connected together by depressed regions or depressions 76, particularly suitable for a handgrip in a large sized container. Naturally, alternate shapes can be provided. Internal wall members 78, in this embodiment are provided in hollow space 73 bonded to depressions 76 forming four arcuate lobes and providing support therefor. The supported handgrips thus provided will not evert as the bottle is pressurized.

Figure 17:
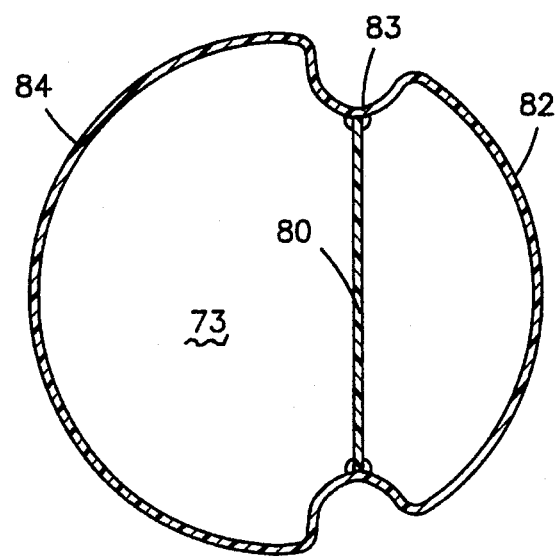

In the embodiment of FIG. 17, a single internal wall member 80 is shown with lobe 82 being smaller than lobe 84 and with the internal wall crossing hollow space 73 spaced from the center thereof. The internal wall 80 is bonded to depressions 83 and provides support therefor. In contrast, the embodiment of FIG. 16 shows lobes 74 of approximately equal size and with the internal supporting walls crossing the center of hollow space 73. As can be appreciated, the present invention readily contemplates the use of one, two or more internal supporting walls.

Figure 19:
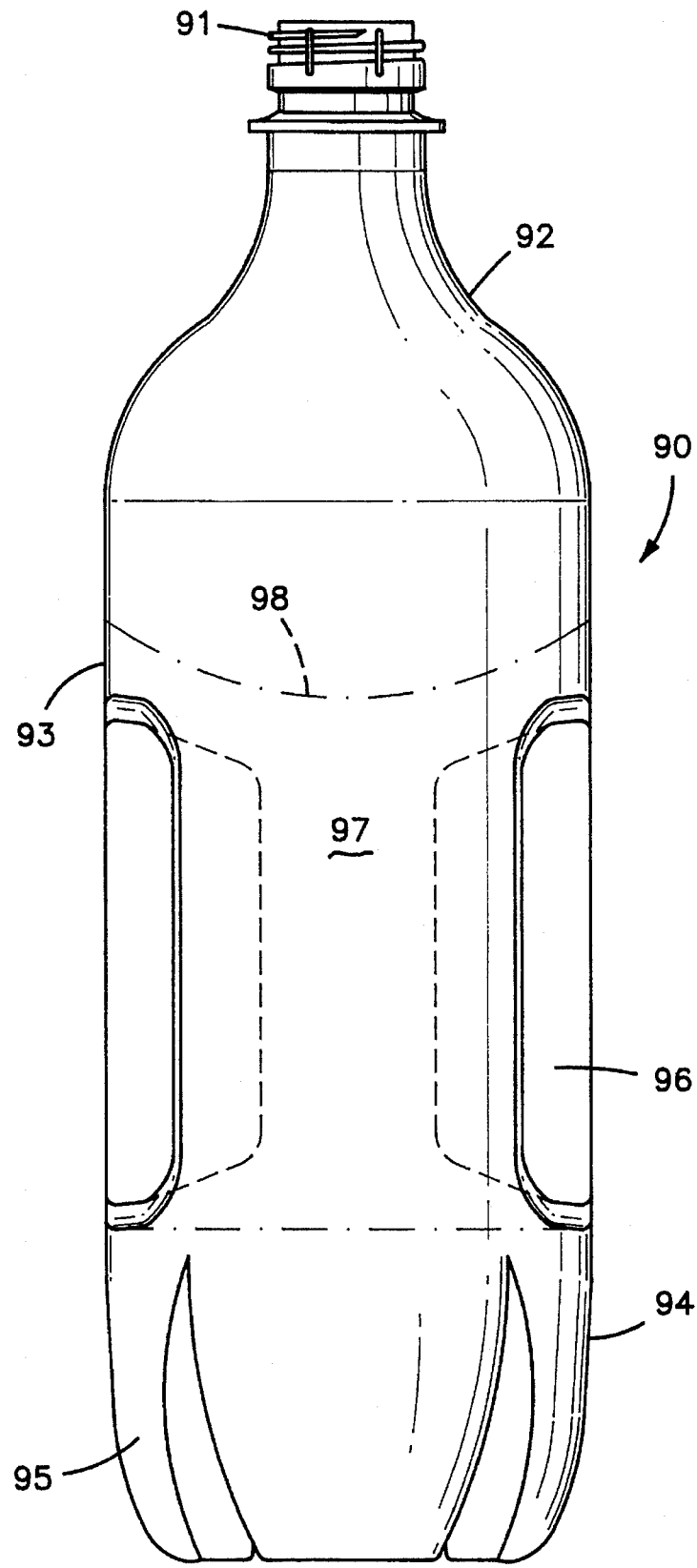
FIG. 19 is an elevational view of an alternate embodiment of a container of the present invention.

FIG. 19 shows a container 90 of the present invention including a threaded neck portion 91, shoulder portion 92, body portion 93 and bottom portion 94 similar to the embodiment of FIG. 15, but in this case the bottom portion 94 includes a plurality of supporting feet 95 and the body portion 93 includes a handgrip 96 with internal support member 97. In this embodiment, upper portion 98 of support member 97 is concavely curved. It has been found that the upper edge of the internal wall is the cause of excessive concentration of stress when the container is pressurized, which may result in rupture of the container especially when pressure rises in an overheated storage space. The embodiment of FIG. 19 minimizes the stress concentration by extending the inner wall above the upper edge of handgrip 96. As shown in FIG. 19, the inner wall 97 curves downward because in that way the greatest amount of thinning of the wall occurs away from the indentation where a thicker cross-section is desirable.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A unitary plastic container which comprises:
   a blow molded, biaxially oriented plastic container prepared from a molded single plastic preform having a neck portion defining an opening, and an integral bottom portion and a body portion interconnecting the neck and bottom portions and integral therewith;
   wherein said neck, body and bottom portions define a hollow space closed at the bottom and open at the neck;
   at least one internal member separately formed from said blow molded plastic container, extending completely across said hollow space, wherein said internal member has edge portions thereof which engage the body portion and are joined thereto at distinct boundaries; and
   wherein said bottom portion includes an axially inwardly directed bottom part.

2. A container according to claim 1, wherein the internal member is joined to both the body and bottom portions.

3. A container according to claim 1, wherein the internal member is limited in extent so that it is joined only to the body portion.

4. A container according to claim 1, wherein the internal member includes a solid portion and said container includes a shoulder portion between the neck and body portions, and wherein the solid portion of the internal member terminates in the body portion spaced from at least one of the shoulder portion and the bottom portion.

5. A container according to claim 1, wherein the body portion defines regions that comprise at least two adjoining lobes, with said lobes having two spaced depressions and a wall portion extending from one spaced depression to the other to form a handgrip, and with said internal member extending from one spaced depression to the other.

6. A container according to claim 1, wherein the internal member has an upper portion wherein the upper portion is concavely curved.

7. A container according to claim 1, wherein the internal member is welded to the body portion.

8. A container according to claim 1, wherein the internal member is adhesively bonded to the body portion.

9. A container according to claim 1, wherein the internal member is at least one of the same material and a different material than the plastic container.

10. A container according to claim 1, wherein said neck includes external threads.

11. A container according to claim 1, wherein said blow molded plastic container is formed from a preform including a separately formed internal member joined therein.

12. A blow molded plastic container prepared from a molded plastic preform, which comprises:
- a molded and blown plastic article having a neck portion defining an opening, a bottom portion and a body portion interconnecting the neck and bottom portions and integral therewith;
- wherein said neck, body and bottom portions define a hollow space closed at the bottom and open at the neck;
- at least one internal member separately formed from said molded plastic article, extending completely across said hollow space, wherein said internal member has edge portions thereof which engage the body portion and are joined thereto; and
- wherein the internal member includes a solid portion extending completely across said hollow space and welded to the body portion, and a frame portion adjoining the solid portion extending to the bottom portion and welded to both the body and bottom portions, including a hollow open internal space between the solid portion of the internal wall and the bottom portion of the container.

13. A blow molded plastic container prepared from a molded plastic preform, which comprises:
- a molded and blown plastic article having a neck portion defining an opening and an integral bottom portion and a body portion interconnecting the neck and bottom portions and integral therewith;
- wherein said neck, body and bottom portions define a hollow space closed at the bottom and open at the neck;
- at least one internal member separately formed from said molded plastic article, extending completely across said hollow space, wherein said internal member has edge portions thereof which engage the body portion and are joined thereto; and
- wherein the internal member includes a solid portion extending completely across said hollow space and bonded to the body portion, and a frame portion adjoining the solid portion between the bottom portion and the solid portion and bonded to the body portion, including a hollow open internal space between the solid portion of the internal wall and the bottom portion of the container.

14. A blow molded plastic container prepared from a molded plastic preform, which comprises:
- a molded and blown plastic article having a neck portion defining an opening and an integral bottom portion and a body portion interconnecting the neck and bottom portions and integral therewith;
- wherein said neck, body and bottom portions define a hollow space closed at the bottom and open at the neck;
- at least one internal member separately formed from said molded plastic article, extending completely across said hollow space, wherein said internal member has edge portions thereof which engage the body portion and are joined thereto; and
- wherein the internal member includes a decoration thereon which is visible through the plastic article.

15. A unitary plastic container which comprises:
- a blow molded, biaxially oriented plastic container prepared from a molded single plastic preform having a neck portion defining an opening, and an integral bottom portion and a body portion interconnecting the neck and bottom portions and integral therewith;
- wherein said neck, body and bottom portions define a hollow space closed at the bottom and open at the neck;
- at least one internal member separately formed from said blow molded plastic container, extending completely across said hollow space, wherein said internal member has edge portions thereof which engage the body portion and are joined thereto at distinct boundaries; and
- wherein said bottom portion includes a plurality of supporting feet.

16. A container according to claim 15, wherein the internal member is joined to both the body and bottom portions.

17. A container according to claim 15, wherein the internal member is limited in extent so that it is joined only to the body portion.

18. A container according to claim 15, wherein the internal member includes a solid portion and said container includes a shoulder portion between the neck and body portions, and wherein the solid portion of the internal member terminates in the body portion spaced from at least one of the shoulder portion and the bottom portion.

19. A container according to claim 15, wherein the body portion defines regions that comprise at least two adjoining lobes, with said lobes having two spaced depressions and a wall portion extending from one spaced depression to the other to form a handgrip, and with said internal member extending from one spaced depression to the other.

20. A container according to claim 15, wherein the internal member has an upper portion wherein the upper portion is concavely curved.

21. A container according to claim 15, wherein the internal member is welded to the body portion.

22. A container according to claim 15, wherein the internal member is adhesively bonded to the body portion.

23. A container according to claim 15, wherein the internal member is at least one of the same material and a different material than the plastic container.

24. A container according to claim 15, wherein said neck includes external threads.

25. A container according to claim 15, wherein said bottom portion includes a plurality of supporting feet.

* * * * *